United States Patent
Pognant

(10) Patent No.: US 11,868,097 B2
(45) Date of Patent: Jan. 9, 2024

(54) METHOD FOR CONFIGURING AND SUPERVISING A HOME AUTOMATION INSTALLATION

(71) Applicant: SOMFY ACTIVITIES SA, Cluses (FR)

(72) Inventor: Sylvain Pognant, Seynod (FR)

(73) Assignee: SOMFY ACTIVITIES SA, Cluses (FR)

( * ) Notice: Subject to any disclaimer, the term of this patent is extended or adjusted under 35 U.S.C. 154(b) by 721 days.

(21) Appl. No.: 16/319,437

(22) PCT Filed: Jul. 20, 2017

(86) PCT No.: PCT/FR2017/051981
§ 371 (c)(1),
(2) Date: Aug. 30, 2019

(87) PCT Pub. No.: WO2018/015670
PCT Pub. Date: Jan. 25, 2018

(65) Prior Publication Data
US 2020/0125056 A1    Apr. 23, 2020

(30) Foreign Application Priority Data
Jul. 22, 2016 (FR) ..................................... 16/56996

(51) Int. Cl.
*G05B 19/042* (2006.01)
*G05B 23/02* (2006.01)
(Continued)

(52) U.S. Cl.
CPC ..... *G05B 19/0426* (2013.01); *G05B 23/0216* (2013.01); *G08B 21/182* (2013.01);
(Continued)

(58) Field of Classification Search
CPC ................ G05B 15/02; G05B 19/0426; G05B 2219/163; G05B 2219/2642;
(Continued)

(56) References Cited

U.S. PATENT DOCUMENTS 8,781,633 B2   7/2014  Fata et al.
9,152,737 B1  10/2015  Micali et al.
(Continued)

FOREIGN PATENT DOCUMENTS

WO       2015106766 A1     7/2015

OTHER PUBLICATIONS

International Search Report for Application No. PCT/FR2017/051981.
(Continued)

*Primary Examiner* — Quan Zhen Wang
*Assistant Examiner* — Rajsheed O Black-Childress
(74) *Attorney, Agent, or Firm* — CANTOR COLBURN LLP

(57) ABSTRACT

The present invention relates to a method for configuring a management unit connected to at least one home automation equipment comprising at least one home automation device (D) and at least one central control unit (U), the method being implemented by a management unit (Sv) and comprising the following steps: configuring (EcfSv2) an alert (Al) corresponding to the triggering of an alert notification and/or an action when a triggering condition (Cnd) is produced relating to at least one state variable for a home automation device (D), a group of home automation devices (D), a type of home automation device (DT) or a group of types of home automation devices (DT); the step of configuring an alert (Al) being carried out on the basis of instructions of a first user (Usr1) having a first user profile type; declaring (ECfUsr26) the monitoring of an assembly of
(Continued)

home automation devices (D) comprising at least one home automation device (D) for which at least one alert (Al) has been configured by a second user (Usr2) having a second user profile type, downloading the alert (Al) condition (Cnd) on at least one central control unit (U) to which at least one home automation device (D) belonging to the group of home automation devices (D) is connected, in order to configure the home automation device (D) for evaluating the condition (Cnd) and sending a notification of production of the condition to the management unit. The present invention also relates to a method for monitoring said equipment.

12 Claims, 4 Drawing Sheets

(51) Int. Cl.
  G08B 21/18 (2006.01)
  H04L 12/28 (2006.01)
  H04L 67/306 (2022.01)

(52) U.S. Cl.
  CPC ........ *H04L 12/2807* (2013.01); *H04L 67/306* (2013.01); *G05B 2219/2642* (2013.01); *G05B 2223/06* (2018.08)

(58) Field of Classification Search
  CPC ............ G05B 2223/06; G05B 23/0216; G05B 23/0272; G08B 21/182; H04L 12/2807; H04L 12/2823; H04L 67/306
  See application file for complete search history.

(56) References Cited

U.S. PATENT DOCUMENTS

| | | | |
|---|---|---|---|
| 9,749,844 | B1 | 8/2017 | Sovani et al. |
| 11,070,391 | B2 | 7/2021 | Pognant |
| 2005/0143671 | A1 | 6/2005 | Hastings et al. |
| 2005/0200474 | A1 | 9/2005 | Behnke |
| 2006/0238339 | A1 | 10/2006 | Primm et al. |
| 2008/0143517 | A1 | 6/2008 | Goffin |
| 2008/0281472 | A1 | 11/2008 | Podgorny et al. |
| 2009/0062964 | A1* | 3/2009 | Sullivan .................. G05B 15/02 700/276 |
| 2009/0113538 | A1 | 4/2009 | Eom et al. |
| 2010/0262467 | A1 | 10/2010 | Barnhill, Jr. et al. |
| 2010/0274366 | A1 | 10/2010 | Fata et al. |
| 2011/0046792 | A1 | 2/2011 | Imes et al. |
| 2013/0231782 | A1 | 9/2013 | Lee et al. |
| 2014/0156081 | A1 | 6/2014 | Ha |
| 2014/0266671 | A1 | 9/2014 | Huynh et al. |
| 2014/0359042 | A1* | 12/2014 | Fenley ................. H04L 12/6418 709/208 |
| 2014/0375440 | A1 | 12/2014 | Rezvani et al. |
| 2015/0054947 | A1 | 2/2015 | Dawes |
| 2015/0106061 | A1 | 4/2015 | Yang et al. |
| 2015/0127165 | A1 | 5/2015 | Quam et al. |
| 2015/0163412 | A1 | 6/2015 | Holley et al. |
| 2016/0017207 | A1 | 1/2016 | Barnes et al. |
| 2017/0039841 | A1* | 2/2017 | Wilson ................. G08B 25/002 |
| 2017/0084143 | A1* | 3/2017 | Acera ..................... H02J 50/80 |
| 2017/0097619 | A1 | 4/2017 | Welingkar et al. |
| 2017/0191693 | A1 | 7/2017 | Bruhn et al. |
| 2019/0280891 | A1 | 9/2019 | Pognant |

OTHER PUBLICATIONS

Written Opinion for Application No. PCT/FR2017/051981.
International Search Report for Application No. PCT/FR2017/051980.
International Search Report for Application No. PCT/FR2017/051982.
U.S. Final Office Action; dated Nov. 4, 2020; U.S. Appl. No. 16/319,433, filed Apr. 10, 2019; 19 pages.
U.S. Final Office Action; dated Sep. 15, 2021; U.S. Appl. No. 16/319,431, filed May 17, 2019; 20 pages.
U.S. Non-Final Office Action; dated May 27, 2021; U.S. Appl. No. 16/319,431, filed May 17, 2019; 23 Pages.
U.S. Non-Final Office Action; dated May 29, 2020; U.S. Appl. No. 16/319,433, filed Apr. 10, 2019; 20 pages.
U.S. Notice of Allowance; dated Mar. 18, 2021; U.S. Appl. No. 16/319,433; 7 Pages.
Written Opinion for Application No. PCT/FR2017/051980.
Written Opinion for Application No. PCT/FR2017/051982.
U.S. Non-Final Office Action; dated Dec. 29, 2021; U.S. Appl. No. 16/319,431, filed May 17, 2019; 18 pages.
U.S. Final Office Action; dated May 11, 2022; U.S. Appl. No. 16/319,431, filed May 17, 2019; 26 pages.
Opinion dated Mar. 24, 2017; FR Application No. 1656996; 6 pages (non-English).
Search Report dated Mar. 24, 2017; FR Application No. 1656996; 2 pages.
International Search Report for Application No. PCT/FR2017/051980; dated, Jul. 22, 2016.
International Search Report for Application No. PCT/FR2017/051981; dated, Mar. 24, 2017.
International Search Report for Application No. PCT/FR2017/051982; dated, Jul. 22, 2016.
Written Opinion for Application No. PCT/FR2017/051980; dated, Jul. 22, 2016.
Written Opinion for Application No. PCT/FR2017/051981; dated, Jul. 22, 2016.
Written Opinion for Application No. PCT/FR2017/051982; dated, Jul. 22, 2016.

* cited by examiner

METHOD FOR CONFIGURING AND SUPERVISING A HOME AUTOMATION INSTALLATION

CROSS REFERENCE TO RELATED APPLICATIONS

This application is a National Stage of PCT Application No. PCT/FR2017/051981 filed on Jul. 20, 2017, which claims priority to French Patent Application No. 16/56996 filed on Jul. 22, 2016, the contents each of which are incorporated herein by reference thereto.

FIELD OF THE INVENTION

The present invention concerns a method for configuring and a method for supervising a home automation installation.

BACKGROUND

A home automation installation of a building may comprise a plurality of home automation devices. It is known to proceed with the configuration, and the monitoring, that is to say, with the control and/or the supervision of said installation by using a central control unit which communicates with one or several home automation device(s).

A plurality of home automation devices belonging to several distinct home automation installations can be supervised or maintained by maintenance operators. These operators should proceed with preventive maintenance or repair operations during a malfunction of a device.

These operations require displacements to proceed with the operations, as well as an on-site or remote supervision which requires a considerable amount of time. Therefore, it is possible that the maintenance or repair operations are not executed within a satisfactory timeframe because of the number of devices to be supervised. It is also possible that the operations do not correspond to a situation requiring this intervention. Indeed, in order for supervision to be effective, maintenance operators should be able to provide for and detect the occurrence of a malfunction based on the communicated information and/or the evolution thereof, which requires a complex interpretation of said supervision information.

The present invention aims at solving all or part of the above-mentioned drawbacks.

BRIEF SUMMARY

To this end, the present invention concerns a method for configuring a management unit connected to at least one home automation installation comprising at least one home automation device and at least one central control unit, the method being implemented by a management unit and comprising the following steps of:

Configuring an alert corresponding to the triggering of an alert notification and/or an action upon fulfilling a trigger condition relating to at least one state variable for a home automation device, a group of home automation devices, a home automation device type or a group of home automation devices types; the step of configuring an alert being carried out based on at least one instruction of a first user having a user profile of a first type;

Recording the declaration of the supervision of a set of home automation devices comprising at least the home automation device, by a second user having a user profile of a second type;

Downloading the trigger condition of the alert on the at least one central control unit to which at least one home automation device, for which the alert has been configured, is related, in order to configure the central control unit for the evaluation of the condition and the emission of a notification of fulfillment of the condition to the management unit.

Thanks to the arrangements according to the invention, an alert notification can be communicated to a user of the second type when the trigger condition of an alert is fulfilled, based on a configuration carried out by a user of the first type. Thus, the set-up of the maintenance of the home automation devices is facilitated by limiting or more appropriately targeting the on-site maintenance or repair operations.

Indeed, the method implements a configuration which enables a first user of a first type to define at least one alert defining a trigger condition of an alert notification intended to be sent to the user having a profile of the second type when the trigger condition is met for a device comprised in the set associated to the user having a profile of the second type. An expert user of the first type can thus define relevant alerts for devices types, so that the users of the second type could be alerted wisely in case of prediction of a malfunction and thus optimize the maintenance operations. It should be noted that the term configuration means the creation or the update of an alert.

The evaluation of the condition on a central control unit allows limiting the resources required on the management unit and the network communications during the execution.

According to a first possibility, the configuration step is carried out when a certain number of home automation devices are installed and related to central control units. In this case, the management unit can determine the concerned devices in the home automation installations, determine the concerned central control units, then trigger the download on at least one concerned central control unit. According to a second possibility, when a home automation device is related to a central control unit, or during activation or update of said central control unit, the attachment of the home automation device is reported to the management unit. The management unit can then determine the conditions of the already defined alerts that apply to the home automation device, and thereafter proceed with the download of the corresponding condition.

The steps of the method imply that the download of the condition is performed after the configuration of the alert and the corresponding condition. The step of recording the declaration of the supervision of a set comprising at least one device by a user of the second type can be performed before or after each of the configuration and download steps.

An alert corresponds to the triggering of an alert notification and/or an action upon fulfilling a trigger condition relating to at least one state variable for a home automation device, a type of home automation device or a list of home automation devices types.

The trigger condition contains a reference to at least one state variable of a device. The trigger condition can also take into account one or several external variable(s), for example corresponding to a value being assigned by default and which can be customized by device instance. The trigger condition can also take into account previous values of one or several device state variable(s), by exploiting a history-keeping capacity of the management unit in order to set up an algorithm and, for example, to estimate a variation rate by determining a derivative or to proceed with an anomaly detection by a statistical analysis.

The trigger condition can be associated with a notion of temporal hysteresis or threshold hysteresis on the variation of one or several measured parameter(s). This hysteresis allows not triggering an alert in an abusive manner when the measured parameters are subject to fluctuation.

The trigger condition of the alert can be defined in the form of an expression of a language which can be evaluated, interpreted or compiled, by the server.

This language may be a simple language allowing describing Boolean expressions, by comprising in particular comparison operators and Boolean operators, or a complete programming language.

An alert can be associated to an alert level or a priority level of the alert; As example, an alert may correspond to an information level or to an alert concerning a blocking problem on the installation.

An alert notification thus corresponds to sending information relating to the triggering of an alert to a user, according to a variable communication mode. The alert notifications can be communicated along with the current or collected in an interface that the user can consult whenever he wants. A combination of different modes of communicating the alert notification can also be set up. Thus, the communication mode for the alert notifications can be various, for example by SMS, by email, or on a dedicated communication interface.

It is possible to be notified on the apparition of the alert but also on the return to normal by detecting when the trigger condition is met, but also to obtain an alert notification when the condition is no longer met.

An action can be defined in case of fulfillment of the condition, corresponding for example to a command on a device, in particular a setting/set-up of a degraded mode, or else a deactivation or a blocking of the device.

According to an aspect of the invention, the management unit is a server remotely connected to the at least one home automation installation, via a wide area network. It should be noted that the term server is a logical designation which may cover the use of several physical servers to distribute the computer processing load to be carried out.

According to another aspect of the invention, the management unit is a central unit intended to be connected to one or several central control unit(s) on distinct private or local area networks, or else on the same local area network.

The first user(s) having a first profile type correspond to an expert user who creates the alert. This first type of user profile has extensive rights over all devices of a given type. In particular, this may be the manufacturer of the devices or a distributor of the home automation devices.

The second user(s) having a second profile type correspond to a user who can subscribe to an alert. In particular, this may be an installer or a maintenance agent who has rights on devices that he has to supervise, in particular remotely.

In the context of the present invention, a home automation device is a home automation equipment and/or a sensor, or else a home automation equipment portion or a sensor portion corresponding to a functional subset. A home automation device may also correspond to a control point of other home automation devices.

In the context of the present invention, a home automation devices type corresponds to a category of devices which are identical, similar or sharing features and at least one definition of a state variable. As example, a type may correspond to a particular model of rolling shutter, alarm or portal.

According to an aspect of the invention, the method comprises a step of configuring an alert corresponding to the triggering of an alert notification and/or an action upon fulfilling a trigger condition relating to at least one state variable for the home automation device type or the group of home automation devices types; the step of configuring an alert being carried out based on at least one instruction of a first user having a user profile of a first type. In the context of the present invention, a message is an information element notified or received via a communication module from an external equipment, or in the form of a synchronous or asynchronous call, which may also correspond to a local or remote function call.

In the context of the present invention, an installation is a set comprising a plurality of home automation devices and at least one central control unit disposed in a single building or on a plurality of locations, each home automation device being connected to a central control unit among the plurality of central control units, the plurality of central control units forming a group under the monitoring of a user. The electronic devices form groups of at least one home automation device related to a central control unit.

In the context of the present invention, a central control unit of the home automation installation is an electronic unit comprising:
- at least one processing unit for containing and executing at least one computer program,
- at least one communication module intended to monitor and/or control at least one home automation device; and
- at least one module for communication with the management unit.

The electronic unit may be independent or integrated into a home automation device. In the latter case, the communication module intended to monitor and/or control the device may be a communication module internal to the home automation device and/or a communication module intended to monitor and/or control other home automation devices.

In some applications, a central control unit may communicate with the management unit through an intermediate management unit, for example a third-party service provider, whose intermediate management unit provides a service interface or API.

The central control unit may also be integrated into a router and/or a modem achieving a connection to a wide area network, in particular to Internet.

In the context of the present invention, a state variable is a descriptive element of the state of a home automation device. The value of a state variable may correspond to the switching on or off for a switch, or to a degree or percentage of opening for a shutter. Moreover, a state variable may correspond to a measurement value of a sensor, for example to a value of a physical or environment quantity. The description of the states of the devices can be generic or specialized, depending on the local protocol. The identifiers of the state variables can be numeric or alphanumeric. The values of the state variables can use customized or proprietary formats or scales.

In the context of the present invention, a command corresponds to an order which can be given to a home automation device in order to carry out an action by this device or to obtain information in return, for example information relating to a state variable of this device.

According to an aspect of the invention, the declaration step is performed based on instructions from the second user. According to another aspect of the invention, the declaration step can also be automatically performed based on a list of users of the second type and the associated devices.

According to an aspect of the invention, the method comprises a step of configuring the management unit corresponding to the recording of a correspondence between:
- a type or an identifier of an alert notification of fulfillment of a condition, on the one hand, and
- an alert, an alert type or a user alert notification to be sent to a user of the second type, upon reception of the notification of fulfillment of a condition corresponding to the type and to the considered identifier, on the other side.

Thus, the correspondence between an alert and a condition is taken into account at the level of the management unit.

According to an aspect of the invention, the method comprises the following step of:
Recording a first correspondence between said alert and said home automation device, said group of home automation devices, said home automation device type or said group of home automation devices types;

According to an aspect of the invention, the method comprises the following step of:
Recording a second correspondence between the at least one device belonging to the set of home automation devices and a user.

According to an aspect of the invention, the method further comprises the following step of:
Defining a customized configuration of an alert related to a device or a device group, by the second user having a user profile of a second type.

A user of the first type can define the condition in a variable manner. A user of the second type can then modify alerts created by a user of the first type for the devices under his supervision.

As example, a condition can be defined by a user of the first type with a variable threshold, optionally associated to a constraint. For example, the threshold could be changed within the boundaries of an interval. In this case, the customized configuration may correspond to a choice of threshold value in a condition, by giving a customized threshold value, comprised within the boundaries of the interval.

According to an aspect of the invention, in the case where the condition of the alert is customized, this condition is downloaded on the central unit to which the at least one concerned device is related.

According to an aspect of the invention, the method further comprises the following step of:
Providing the user having a profile of a first type with a first interface for configuring an alert and with the corresponding trigger condition.

According to an aspect of the invention, the first interface is arranged to enable the selection of the devices and/or the state variables types to configure an alert and/or the corresponding trigger condition.

According to an aspect of the invention, the method further comprises the following step of:
Providing the user having a profile of a second type with a second interface for selecting installations, devices/ parameters or state variables.

Via this interface, a user of the second type can in particular proceed with the definition of a communication mode for the alert notifications, for example by SMS, by email, or on a dedicated communication interface. A combination of communication modes may also be considered. As example, an SMS or email notification can be sent with a link to a page of a supervision interface.

The user of the second type can also proceed with a definition of the alert notifications that he wishes to receive by device type but also by supervised device instance.

The second interface optionally allows proceeding with the customized configuration of the alerts.

The present invention also concerns a method for supervising a home automation installation comprising at least one home automation device and at least one central control unit, the method being executed by a central control unit and comprising the following steps of:
Receiving a supervision message coming from a home automation device, the supervision message comprising information relating to a value of at least one state variable of the at least one home automation device;
Evaluating a trigger condition depending on information relating to a value of at least one state variable of the at least one home automation device;
Emitting at least one notification message of fulfillment of the condition to a management unit connected to said installation in the case where the trigger condition is fulfilled.

According to an aspect of the invention, the supervision method comprises the steps of the configuration method which are carried out prior to the step of receiving a supervision message.

According to an aspect of the invention, the step of receiving a message may be subsequent to a first step of sending an interrogation or polling message. Alternatively, the sending of the message can be autonomously initiated by the home automation device, for example by detecting an event modifying the value of a state variable. The polling can also be carried out at the initiative of the central control unit, before sending a notification of fulfillment of the condition to the management unit.

According to an aspect of the invention, the step of identifying the type may be based for example on a consultation of information sent in the supervision message, such as an identifier.

According to an aspect of the invention, the step of determining the alerts having a condition to be evaluated can be carried out based on the correspondences recorded during the configuration. According to an aspect of the invention, it is possible to reduce the number of conditions to be evaluated by considering the state variable(s) concerned by the Condition and comparing it/them with the updated state variable.

According to an aspect of the invention, a notification of fulfillment of the condition may be associated to a context, or values to be communicated, and/or an alert level. In particular, the notification message of fulfillment of the condition may comprise at least one context information, such as for example a state variable value or an alert level.

According to an aspect of the invention, the trigger condition corresponds to a condition for triggering an alert, an alert corresponding to the triggering of an alert notification and/or an action during the fulfillment of a trigger condition relating to at least one state variable for a home automation device, a group of home automation device, a home automation device type, or a group of home automation devices types.

According to an aspect of the invention, the method further comprises the following step of:

Determining at least one trigger condition to be evaluated for the home automation device relating to at least one state variable for a home automation device;

These arrangements allow determining one or several condition(s) to be evaluated, in the case where the central control unit is likely to receive supervision messages which are irrelevant for the evaluation of the condition and/or in the case where the central control unit is likely to evaluate several conditions corresponding to several alerts.

According to an aspect of the invention, the supervision method comprises a step of identifying a type of the home automation device concerned by the supervision message, and the step of determining at least one condition to be evaluated, is carried out based on the type of the home automation device.

The present invention also concerns a method for supervising a home automation installation comprising at least one home automation device and at least one central control unit, the method being executed by a management unit connected to said installation and comprising the following steps of:

Receiving a notification message of fulfillment of a condition coming from a central control unit, the notification message of fulfillment of a condition corresponding to the fulfillment of a trigger condition relating to at least one state variable of the at least one home automation device;

Determining at least one user to be notified depending on a correspondence between the device and said user;

Emitting at least one alert notification message to the at least one user.

According to an aspect of the invention, the method comprises a step of determining the alert notification message depending on the definition of an alert corresponding to the triggering of a notification and/or an action during fulfilling a trigger condition relating to at least one state variable for a home automation device or a group of home automation devices, According to an aspect of the invention, the at least one trigger condition is configured by a first user having a profile of a first type, and the step of determining a user to be notified corresponds to the determination of a second user of a second type.

According to an aspect of the invention, the server can proceed with a backup of the triggering of the alert to constitute an alert history.

According to an aspect of the invention, the method further comprises the following step of:

Checking the existence of a configuration specific to the user concerning a desire to receive an alert notification in order to determine whether an alert notification is sent or not.

According to an aspect of the invention, the method further comprises the following step of:

Sending a message to the central control unit U in order to trigger the execution of an action, in particular an action on the home automation device.

According to an aspect of the invention, the method further comprises the following step of:

Storing the values of the at least one state variable.

These arrangements allow a history-keeping of the values of the state variables and the evaluation of trigger conditions relating to several variables which are not sent at the same time and/or to base conditions on a history of values.

The different aspects defined above that are not incompatible can be combined.

BRIEF DESCRIPTION OF THE FIGURES

The invention will be better understood using the detailed description which is exposed below with reference to the appended drawing in which.

DETAILED DESCRIPTION

In the following detailed description of the figures defined above, the same elements or the elements fulfilling identical functions may retain the same references so as to simplify the understanding of the invention.

Description of a System Comprising a Home Automation Installation

Figure 1:
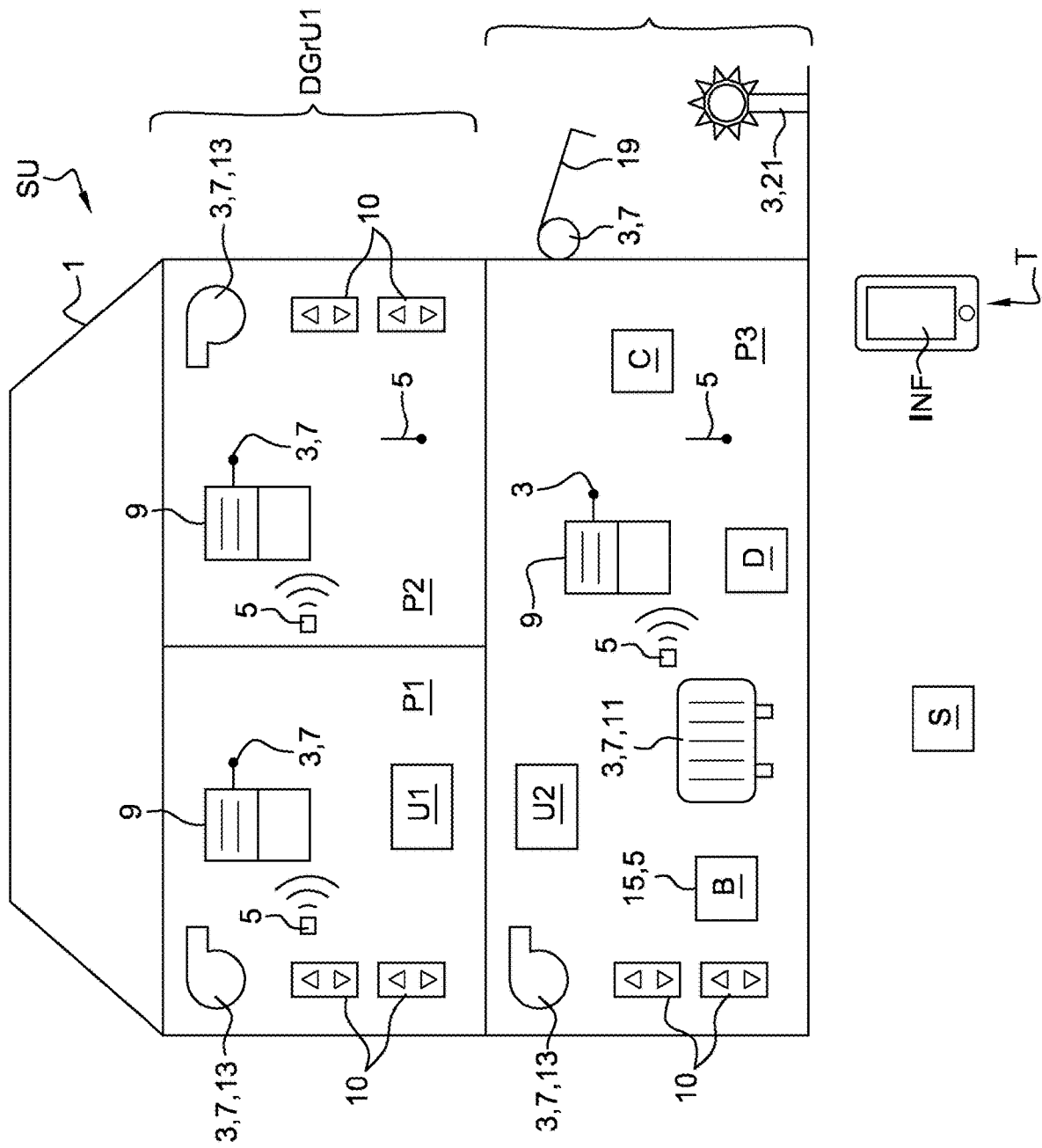
FIG. 1 is a schematic view of a building and a home automation installation in accordance with an embodiment of the invention.

As illustrated in FIG. 1, a building 1 comprises, as example, three rooms P1, P2, P3. The building 1 also comprises home automation equipment 3 and sensors 5.

A home automation equipment 3 may be an actuator arranged to displace or adjust a building element 1, for example an actuator 7 to displace a rolling shutter 9 or a terrace blind 19, or a regulation system 10 for a heater 11 or an aeraulic system 13. A home automation equipment 3 may also be a lighting, for example a terrace outdoor lighting 21 or a lighting control system, an alarm system, or else a video camera, in particular a video-surveillance camera.

The home automation installation SU may also comprise a control point 15 of an actuator 7, such as a wireless control case B for the rolling shutter 9.

The home automation installation SU may comprise one or several sensor(s) 5, integrated with an actuator 7, a control point 15 or else the control case B, or independently of these elements. A sensor 5 may, in particular, be arranged to measure a physical quantity, for example a temperature sensor, a sun lighting sensor or a humidity sensor. Position sensors 5 of home automation equipment 3 of the building 1, such as, for example, sensors of the open state of a rolling shutter 9 or position sensors of a door leaf such as a window, whether motorized or not, can also be provided. The home automation installation may also comprise one or several presence sensor(s).

A home automation equipment 3 and a sensor 5 are thus to be considered as units having available information on observed actual states of elements of the building 1 and being able to share this information with other elements of the home automation installation SU.

The home automation equipment 3 and the sensors 5 may thus have access to any measurable physical quantity, such as the temperature of each room P1, P2, P3 or a state of an element of the building 1, such as the opening state of a rolling shutter 9, the status of an alarm, etc.

Subsequently, we will use the designation of home automation device or device D indifferently to designate sensors or home automation equipment, or else portions of home automation equipment 3 or sensors 5.

The home automation installation SU comprises a central control unit or a plurality of central control units U1, U2. In particular and as example, two central control units U1, U2 are represented in FIG. 1. According to a variant, a home automation installation may also comprise a single central control unit Each central control unit U1, U2 is arranged for controlling and/or monitoring a portion of the devices D of the installation SU forming a group DGrU1, DGrU2. As example, in FIG. 1, the central control unit U1 is in charge of the devices D disposed in the rooms P1 and P2 of the first floor of the building, while the central control unit U2 is in charge of the devices D disposed in the room P3 on the ground floor of the building and of the external devices.

In particular, the control and/or the monitoring is performed remotely, in particular by using a wireless communication protocol, for example a radio communication protocol. Each central control unit U1, U2 is arranged to group all data coming from the devices D of the group DGrU1, DGrU2 thereof and to process these data.

Figure 2:
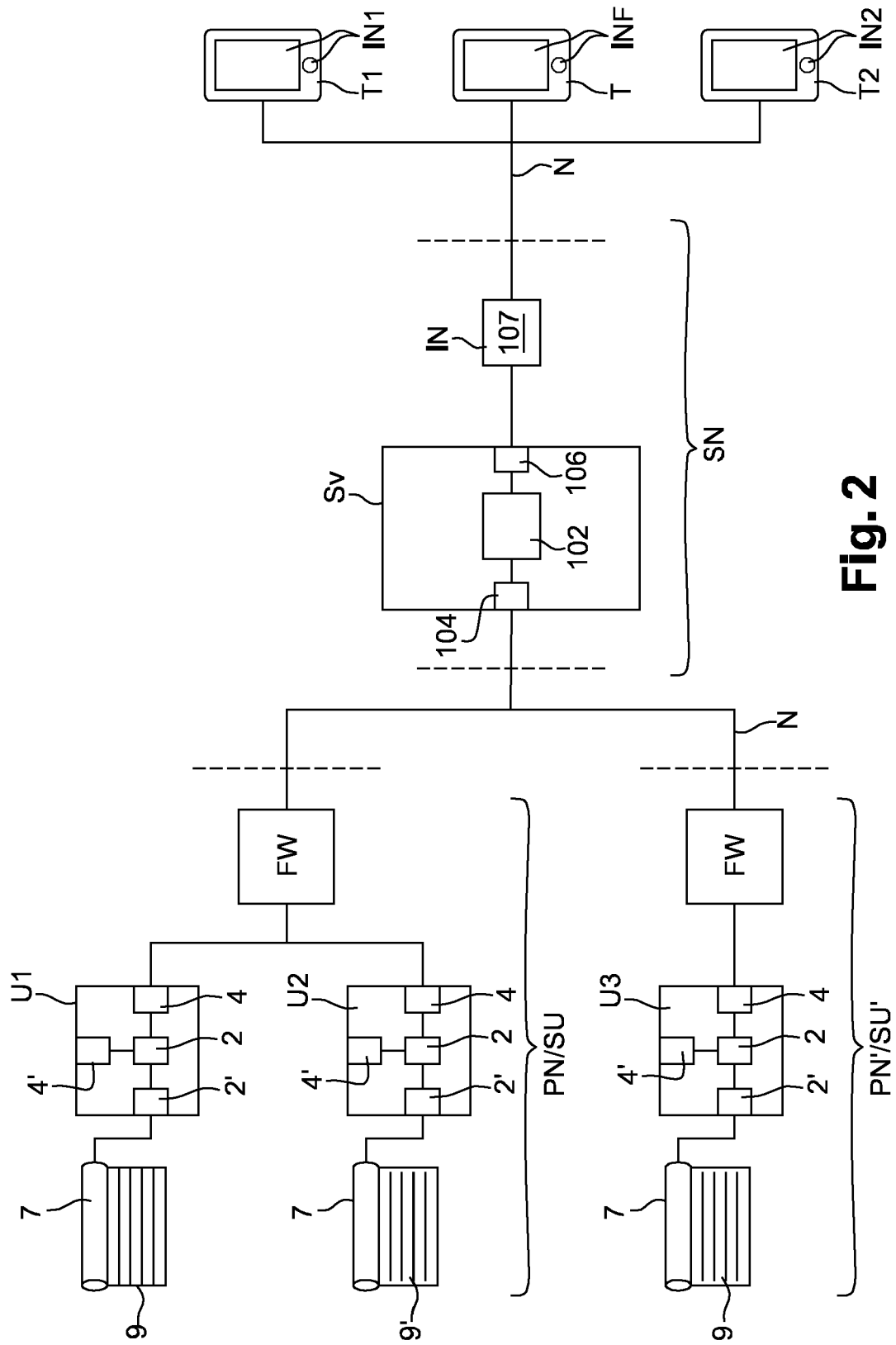
FIG. 2 is a diagram having an architecture of a system comprising the home automation installation illustrated in FIG. 1, a second home automation installation, as well as a server intended to be connected to a user terminal.

As represented in FIG. 2, each central control unit U is arranged to communicate with a server Sv.

The central control units U1, U2, U3 are disposed on a private network PN, PN', whose access is generally protected by a firewall FW. In particular, in the example represented in FIG. 2, two central control units U1, U2 are disposed on a first private network corresponding to a first home automation installation, while a third central control unit U3 is disposed on a second private network PN', independent of the private network PN corresponding to a second home automation installation SU'. The server Sv is also disposed on a private network SN. The private network PN is connected to a wide area network N, for example Internet. Of course, the server Sv is arranged to communicate with a set of such central control units U. We will describe one of these units later.

A central control unit U comprises a processing unit 2 arranged to contain and execute a first computer program. As example, the processing unit 2 comprises a processor, a storage flash memory as well as a random access memory, and an Ethernet chip.

The central control unit U further comprises at least one communication module 2' intended for the monitoring and/or the control of home automation equipment 3 and/or sensors 5, the home automation equipment 3 might be actuators 7, lightings 21, an alarm system, or a video camera.

As example, as represented in FIG. 2, the communication module 2' enables the monitoring and the control of at least one actuator 7, of a movable element of the building 1, such as for example a rolling shutter 9, or an orientable sunshade 9' or other actuators 7 or lightings 21, as previously described with reference to FIG. 1, according to the first local communication protocol P1.

For example, the communication module 2' may be arranged to implement for example one or more of the first local protocols P1 such as for example Z-Wave, EnOcean, 10 Homecontrol, Somfy RTS, KNX, MODBUS, Wavenis, Philips HUE. In general, these first local protocols are non-IP local communication protocols.

According to another possibility, for example in the context of alarm systems, the central control unit can be integrated into the home automation device. According to yet another possibility, it is also possible for the central control unit to be integrated in a router and/or a modem achieving a connection to a wide area network, in particular to Internet.

The reception of information from a sensor 5 providing information on the presence of a user or values of surrounding parameters, such as temperature, humidity and brightness, is also provided. In the same manner, the central unit U can allow the monitoring and/or the control of an alarm system.

Each central control unit U may further comprise a communication module 4' for communicating according to a second target communication protocol P2, with a mobile communication terminal T. The second target communication protocol may for example be a communication protocol above the protocol IP on a local area network, or else a generic point-to-point protocol. As example, the application protocol WEAVE using 6lowpan and thread transport protocols for a mesh network may constitute a second target protocol. Other examples include Bluetooth, Zigbee or Wifi.

The communication terminal T may contain and execute an application software APP.

Each central control unit U further comprises a module 4 for communication with the server Sv. The server Sv enables the remote control and/or monitoring and comprises one or several processing unit(s) 102 arranged to contain and execute a second computer program.

In some applications, a central control unit U may communicate with the server Sv through an intermediate server, for example a third-party service provider, whose intermediate server provides a service interface or API. In turn, the server Sv comprises at least one communication interface 104 intended for the communication with the central unit U.

The server Sv may also comprise a communication interface 106 intended for the communication with a control and/or monitoring interface INF enabling an end user to remotely monitor the home automation installation.

It should be noted that the term server is a logical designation which may cover the use of several physical servers to distribute the computer processing load to be carried out.

The control and/or monitoring interface INF comprises, for example, a web server 107 and a mobile communication terminal T communicating by the wide area network N. The mobile communication terminal T may be, for example, a smartphone or a tablet. The mobile communication terminal T may be the same or a terminal of the same type as that with which the central control unit U locally communicates by means of the communication module 4', or a different terminal. We will indifferently designate these mobile terminals by the reference T.

The control and/or monitoring interface IN comprises a processor which may be disposed at the level of the web server 107 and/or the mobile communication terminal T.

The processor of the control and/or monitoring interface IN is arranged to use a third computer program. In turn, this third computer program is arranged to execute a downloadable application.

The mobile communication terminal T comprises a data input device and a display device, for example in the form of a touch control portion of a screen of the terminal T and in the form of one or several button(s) of the terminal T.

Unique Identifier of a Home Automation Device

The server Sv and the central control units U may use a unique identifier to identify the home automation devices. The structure of a unique identifier of a home automation device DURL will now be described correspondingly to a particular embodiment.

According to this embodiment, the unique identifier of a device comprises information on:

The local native protocol of the home automation device D;

The communication path to the device D, including the intermediate central control units U and the end addresses to be crossed, organized or not in a hierarchical topology;

A subsystem identifier subsystemId if the device belongs to a group of devices D associated to the same address. The devices that have a single expression of an address do not have an identification extension of a subsystem.

Thus, the form of the unique identifier of a device DURL can be as follows:

<protocol>://<gatewayId>/<rawDeviceAddress>(#<subsystemId>)

In which the following fields are present:

protocol: identifier of the native device local protocol;

gatewayId: identifier of the first central control unit U, for example a serial number or a unique identifier.

rawDeviceAddress: a simple or several-level path. Its meaning and format depend on the addressing scheme of the local communication protocol of the device D.

subsystemId: this optional field indicates an identification, for example a row of the subsystem (starting for example at 1), if such a subsystem is present.

EXAMPLES 1) knx://0201-0001-1234/1.1.3

This unique identifier DURL corresponds to a device D communicating by the protocol KNX with an individual address 1.1.3 accessible by the central control unit U bearing the identifier #0201-0001-1234.

2) io://0201-0001-1234/145036#2

This unique identifier GDURL corresponds to a subsystem bearing No. 2 associated to a device D communicating by the protocol io homecontrol with a radio address 145036 accessible by the central control unit U bearing the identifier #0201-0001-1234.

First and Second Types of Users

As represented in FIG. 2, the Sv server may communicate with terminals in possession of two types of users who are not necessarily the end user(s) of the installation SU.

In particular, the server Sv can interact with at least one first user UsrT1 having a user profile of a first type UsrT1. The first user type UsrT1 corresponds to an expert user who has extensive rights over all devices D of a given type DT. This may be in particular the manufacturer of the devices or a distributor of the concerned home automation devices.

To this end, an interface IN1 is made available by the server Sv. Access to this interface can be achieved by an application executed on a user terminal T1 of the first user Usr1, or by access by a light client.

The server Sv also interacts with at least one second user Usr2 having a user profile of a second type UsrT2. The second user type Usr2 corresponds in particular to an installer or a maintenance agent who has rights on devices that he has to supervise, in particular remotely.

To this end, an interface IN2 is made available by the server Sv. Access to this interface may be achieved by an application executed on a user terminal T2 of the second user, or by an access by a light client.

Subsequently, we will designate by user of the first type UsrT1 a user having a user profile of the first type UsrT1 and by user of the second type UsrT2 a user having a user profile of the second type UsrT2.

Configuration Method

First Implementation Mode

Figure 3:
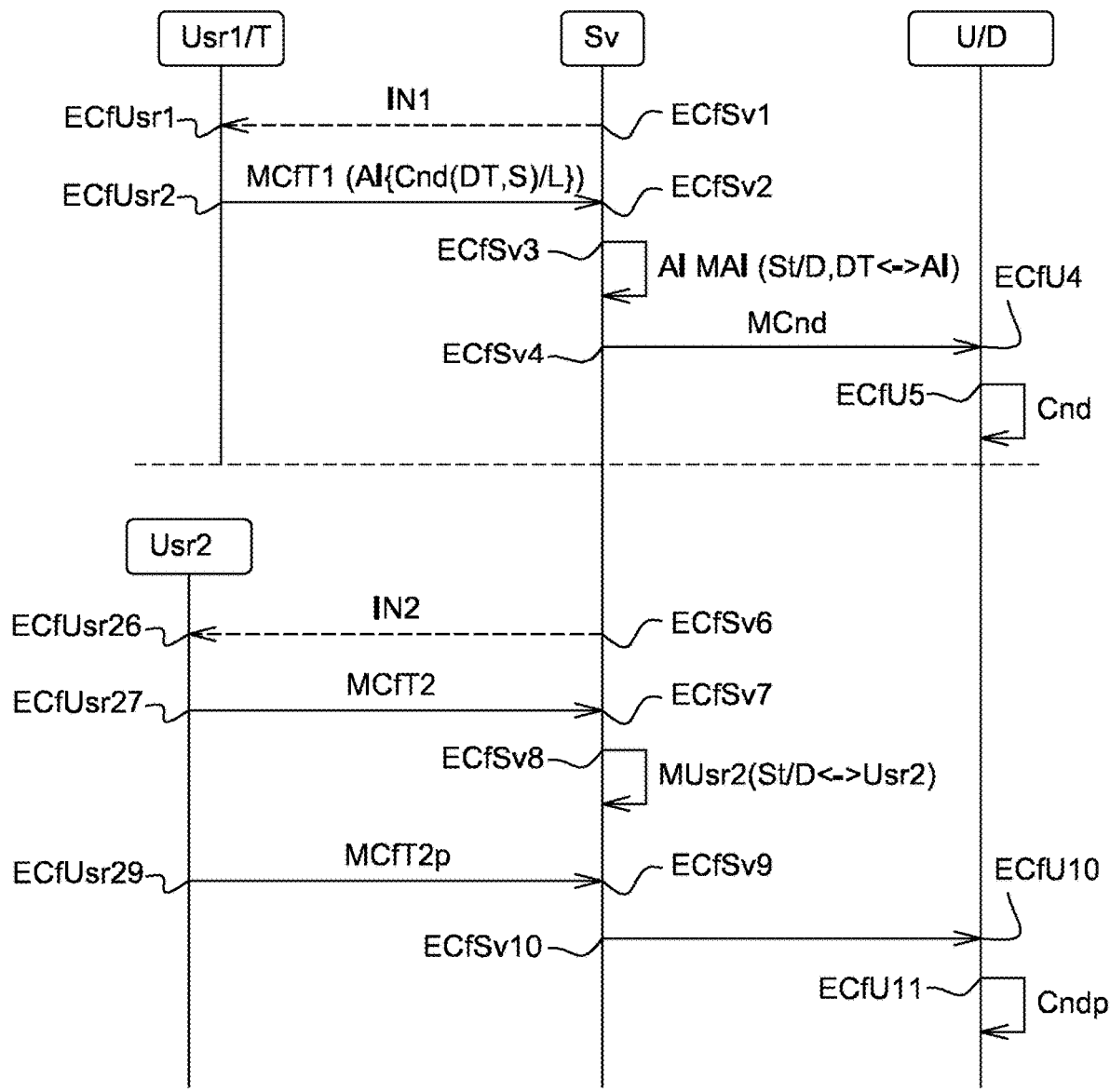
FIG. 3 is a diagram illustrating an embodiment of a method for configuring a home automation installation according to the invention.

We will now describe a first embodiment of a method for configuring a home automation installation SU with reference to FIG. 3.

At a step EcfSv1, the Sv Server makes available the interface IN1 to a first user Usr1 of the first type UsrT1, in particular for the selection of the device types/parameters or state variables in order to allow configuring an alert Al and the corresponding trigger condition Cnd.

At a step EcfUsr2, the user Usr1 of the first type proceeds with the creation and/or the configuration of an alert Al.

An alert Al corresponds to the triggering of an alert notification N and/or an action Ac upon fulfilling a condition relating to at least one state variable S for a device D, a device type DT or a list of devices types DT if the at least one state variable S is supported by the concerned devices. The first user Usr1 has extensive rights over all the devices D or devices types DT concerned by the alert Al in order to be able to create and configure it.

The trigger condition Cnd of the alert Al can be defined in the form of an expression of a language which can be evaluated, interpreted or compiled by the server.

This language may be a simple language allowing describing Boolean expressions, by comprising in particular comparison operators and Boolean operators, or a complete programming language.

The trigger condition Cnd contains a reference to at least one state variable S of a device D. The trigger condition Cnd can also take into account one or several external variable(s), corresponding for example to a value assigned by default and which can be customized by device instance. The trigger condition Cnd can also take into account previous values of one or several state variable(s) of devices D, by exploiting the history-keeping capacity of the server Sv in order, for example, to estimate a variation speed by determining a derivative or proceeding with an anomaly detection by statistical analysis.

The trigger condition Cnd can be associated with a notion of temporal hysteresis or threshold hysteresis on the variation of one or several measured parameter(s). This hysteresis allows not triggering an alert in an abusive manner when the measured parameters are subject to fluctuation.

An alert Al can be associated to an alert level or priority level of the alert; As example, an alert may correspond to an information level or an alert concerning a problem blocking the installation.

It is possible to be notified on the occurrence of the alert but also on the return to normal by detecting when the trigger condition is met, but also to obtain an alert notification when the condition is no longer met.

It is possible to define the condition in a constant or variable manner, for example with a variable threshold T, optionally associated to a constraint. For example, the threshold could be modified within the boundaries of an interval. These arrangements allow customization as will be described later.

An action Ac can be defined in case of fulfillment of the condition, corresponding for example to a setting set-up of a degraded mode, or else a deactivation or a blocking of the device.

A condition Cnd can take into account historical data on a state variable in order to set up an algorithm. It is also possible to combine several state variables S in the condition.

Examples of conditions Cnd will be described later.

At a step EcfSrv3, the Server records the alert Al as well as at least one correspondence MAI between said Alert Al and the devices D, groups of devices, type or groups of devices types DT, the installation or the group of installations. The server can thus maintain, as example, one or several table(s) of correspondence between installations or devices or types of devices and the alerts that can be applied.

The server Sv is moreover configured to record a correspondence between a type or a notification identifier of fulfillment of a condition MNCnd, and a corresponding alert.

Thus, the correspondence between an alert and a condition is taken into account at the level of the management unit.

At a step ECfSv4, the server proceeds with the download of the condition Cnd of the alert Al on the at least one central control unit U to which at least one home automation device D belonging to the group of home automation devices D is related in order to configure the home automation device for the evaluation of the condition Cnd and the emission of a notification of fulfillment of the condition MNCnd to the management unit.

The central control unit U receives the download at a step ECfU4.

At a step EcfU5, the central control unit U is configured for the evaluation of the condition Cnd and the emission of a notification of fulfillment of the condition MNCnd to the management unit.

At a step EcfSv6, the server makes available the user interface IN2 to at least one user of a second type, in particular for the selection of installations, devices/parameters or state variables.

The second user type Usr2 corresponds to a user who can subscribe to an alert. This may be an installer or a maintenance agent who has rights on devices which he has to supervise, in particular remotely.

Optionally, one or several alerts Al created by a user of the first type may be modified by a user of the second type UsrT2 for the devices D under his supervision.

At a step ECfUsr27, a user Usr2 having a profile of a second type proceeds with a declaration of the installations SU and/or the devices D that he supervises in order to constitute a set of home automation devices SDS. This declaration step can also be performed automatically based on a list of users of the second type and associated devices D and/or installations SU.

During this step, a user of the second type can in particular proceed with the definition of a communication mode for the alert notifications, for example by SMS, by email, or on a dedicated communication interface. A combination of communication modes may also be considered. As example, an SMS or email notification can be sent with a link to a page of a supervision interface.

The user of the second type Usr2 can also proceed with a definition of the alert notifications that he wishes to receive by device type DT but also by supervised device instance D. This definition corresponds to a customization of the profile of the user of the second type. The second type user can also proceed with a customization of the alerts on the devices under his supervision, as will be described below.

At a step ECfSv8, upon reception of the configuration message MCfT2, the server proceeds with a record of the correspondence MUsr2 between an installation SU or a device D and a second type user Usr2. The server can thus maintain, as example, one or several table(s) of correspondence between installations or devices and the users of the second type in charge of supervising these devices or installations.

At a step ECfUsr29, a user of the second type Usr2 can proceed with a customized configuration per device D, per device group D or per installation SU of an alert Al related to this device D, device group, installation SU or installation group. In this case, the user of the first type should have given the possibility of modifying the Alert Al to users of the second type. As example, the customized configuration may correspond to a threshold value choice in a condition Cnd, by giving a customized threshold value TP. This customization Cndp can be stored at a step ECfSv28 in connection with a device with the correspondence MAI, or else in connection with the user Usr2 with the correspondence MUsr.

At a subsequent step EcfSv10, the Server Sv proceeds with a download of the customized trigger conditions on the central unit to which the at least one concerned home automation device D is attached.

These arrangements allow carrying out an evaluation of the condition directly on the central control unit, and sending a notification of fulfillment of the condition to the server only if the condition is fulfilled, which allows substantially limiting the resources necessary for the processing of the condition on the server Sv and the traffic between the central unit U and the server Sv.

The central control unit U receives the download at a step ECfU10.

At a step EcfU11, the central control unit U is configured for the evaluation of the customized condition Cndp and the emission of a notification of fulfillment of the condition MNCndp to the Server Sv.

Second Implementation Mode

According to a second implementation which is not represented, when a home automation device D is related to a central control unit U, or when activating or updating said central control unit U, the attachment of the home automation device D is signaled to the Server Sv.

The server Sv can then determine the conditions Cnd of the already defined alerts which apply to the home automation device D, then proceed with the download of the corresponding condition Cnd, as previously described.

It is also possible to subsequently proceed with the definition of a customized condition Cndp, similarly to that described for the first implementation.

Supervision Method

Figure 4:
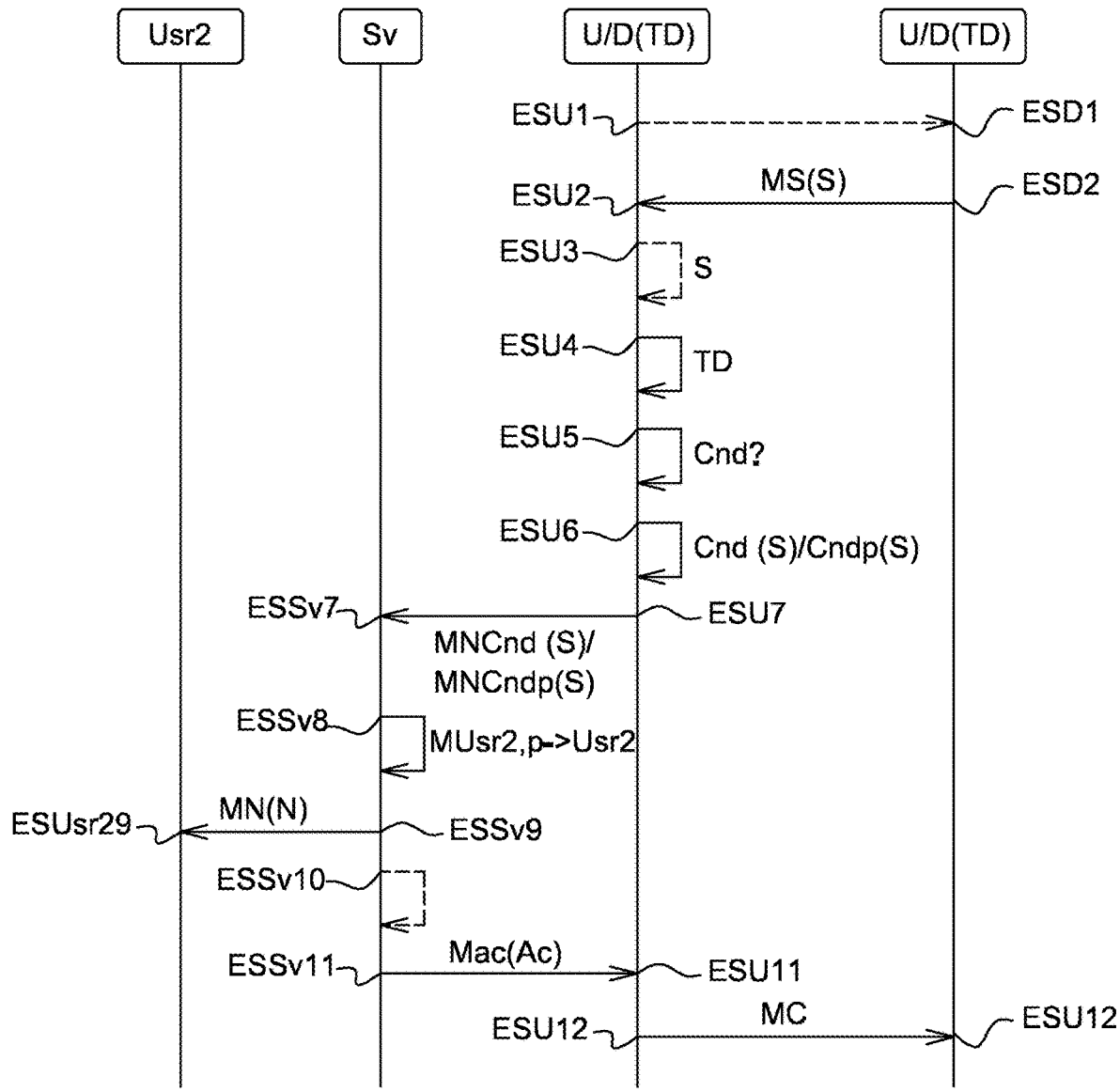
FIG. 4 is a diagram illustrating an implementation of a method for supervising a home automation installation according to the invention.

We will now describe an embodiment of a method for supervising a home automation installation SU with reference to FIG. 4. We will herein assume that the configuration method as described in FIG. 3 has been previously executed.

At a step ESU2, the central control unit Sv receives a supervision message MS emitted by a home automation device D at a step ESD2, the supervision message MS comprising information related to a value of at least one state variable S of the at least one home automation device D. Step ESU2 can be subsequent to a first step ESU1 of sending an interrogation or polling message received by the home automation device D at a step ESD1. Alternatively, the sending of the message MS can be autonomously initiated by the home automation device D, for example by detecting an event modifying the value of a state variable S1D.

At a step ESU3, the central control unit U can carry out an optional storage of the values of the at least one state variable S. This historized storage of the state variable values can be useful for the evaluation of conditions Cnd on several variables which are not sent at the same time, to implement algorithms based for example on the evolution of the values of the state variable S, on the calculation of statistical quantities, or else to implement a hysteresis mechanism.

At a step ESU4, the central control unit U proceeds with an identification of the device type DT. This identification of the type can be based for example on a consultation of information sent in the supervision message, such as an identifier. As example, the data of the unique identifier DURL can be used.

At a step ESU5, the central control unit U proceeds with a determination of the conditions Cnd, Cndp to be evaluated, based on the type TD of the device D.

Steps ESU4 and/or ESU5 may be optional to the extent that only one type of device is related to the central control unit U, or respectively, in the case where only one condition is to be evaluated.

At a step ESU6, the central control unit U proceeds with the evaluation of the condition Cnd or Cndp.

In the case where the condition is met and a notification of fulfillment of the condition MNCnd or MNCndp must be sent, this notification can optionally be associated with a context, or values to be communicated, and/or an alert level.

At a step ESU7, a notification of fulfillment of the condition MNCnd or MNCndp is sent to the server Sv, which receives this notification at a step ESSv7.

At a step ESSv8, the server Sv determines the alert notification message depending on the definition of the corresponding alert Al and the second type user(s) Usr2 to be notified depending on the correspondence between the device D or the installation and the user. Moreover, the alert notification is sent or not depending on the configuration specific to the user Usr2 who wishes or not to receive an alert.

At a step Essv9, the server Sv proceeds with sending at least one alert notification message MN. This alert notification message MN is received by the user at a step ESUsr29.

At a step ESSv10, the server may optionally proceed with a backup of the triggering of the alert to constitute a history of the alerts.

At a step ESSv11, the server can proceed with sending a message Mac to the central control unit U in order to trigger the execution of an action AC, in particular an action on the home automation device D. This message is received at a step ESU11 by the central control unit U. By action, it can in particular be understood a command on a device D.

At a step ESSv11, the central control unit U sends a command message MC to the home automation device so that it executes the command corresponding to the action.

Examples of Alert Trigger Conditions

Some examples of conditions Cnd used in Alerts Al are described below.

Example 1

According to a first example, the object of the trigger condition Cnd of an alert Al is the detection of ignition problems on a device D constituted by a domestic boiler.

Thus, the trigger condition Cnd can be defined as.
Na>NaT
With
Na: Number of consecutive attempts required for the combustion to start during the last ignition.
NaT: alert threshold, for example equal to 3.
This condition Cnd defines that if the value of Na exceeds the threshold NaT, the alert Al is triggered.

This type of condition Cnd allows detecting failed ignitions on the boiler, indicating a wear of the ignition system requiring a replacement before worsening and total failure.

Example 2

According to a second example, the object of the trigger condition Cnd of an alert Al is the follow-up of the operation of a device D constituted by a domestic boiler.

Thus, the trigger condition Cnd can be defined as:
T>Tmax for a period P
with
T: Temperature of the heating body. This temperature is a state variable or parameter of the device whose value is refreshed every minute.
$TMax: Threshold temperature. This threshold value is an external variable which can for example be defined by default at a value of 90° C. by the manufacturer's recommendations.
P: time period, for example 10 minutes.

The above condition uses a «hysteresis» for a period of time P. Thus, if the value of T exceeds $TMax over an uninterrupted period of at least P, the alert is triggered.

Example 3

According to a third example, the object of the condition Cnd is the detection of any abnormal force on a device D constituted by a motorized garage door.

Thus, the trigger condition Cnd can be defined as.
Nt>NtT and Im>ImT
with
Nt: Number of opening/closing cycles of the device since manufacture.
$Ntmax: Use threshold, for example of the range of 100.
Im: Maximum value reached by the electrical current in the motor of the device (in amperes) during the last cycle.
$Immax: Current alert threshold, for example equal to 8 A.

The condition Cnd comprises two cumulative sub-conditions. The sub-condition on Nt allows avoiding false positives during the installation and break-in phase of the device.

Subsequently, if the device has performed at least NtT opening cycles and the call current of the electric motor exceeds ImT, the alert Al is triggered.

This type of condition Cnd allows detecting an abnormal force of the device which can reduce its service life or precede a complete blockage.

Example 4

According to a fourth example, the object of the condition Cnd is the follow-up of the acid consumption of a home automation device D of the automatic pH regulator type for swimming pools.

Thus, the trigger condition Cnd can be defined as:
d(Qa)>$Cmax for a period P
with
Qa: Amount of acid consumed in ml (absolute index, refreshed every 30 minutes)
d(Qa): Acid consumption rate in ml per hour, calculated by derivative over the last 8 hours (by using the values stored by the server every 30 minutes)
$Cmax: Threshold consumption rate in ml per hour: external variable with a default value=10 mL/h
P: period of time, for example 8 minutes.

If the consumption by volume of acid is greater than $Cmax ml/h over the last P hours, the alert is triggered.

This type of condition allows detecting an abnormal regulation situation leading to overconsumption, which can indicate a problem of setting or a deterioration of the device.

Customized Configuration

According to a possibility, in the different examples described above, the first user of the first type UsrT1 can define that the defined thresholds could be set by a user of the second type UsrT2, for example adjustable within a range of values determined by the user of the first type UsrT1.

The invention claimed is:

1. A configuration method for configuring a management unit connected a plurality of home automation installations, each one of the plurality of home automation installations being located on a single building and comprising at least one central control unit and least one home automation device related to each other, the method comprising the following steps of:
configuring, by the management unit, an alert corresponding to a triggering of an alert notification and/or an action upon fulfilling a trigger condition relating to at least one state variable for the at least one home automation device; the step of configuring an alert being carried out based on at least one instruction of a first user having a user profile of a first type;
recording a first correspondence between the alert and said at least one home automation device;
recording, by the management unit, a declaration of a supervision of a set of home automation devices comprising at least the at least one home automation device, by based on instructions from a second user having a user profile of a second type, wherein the first user and the second user are different from each other;
recording a second correspondence between the at least one home automation device and said second user;
uploading, by the management unit, of the trigger condition of the alert, from the management unit to a central control unit to which the at least one home automation device, for which the alert has been configured, is related, in order to configure the central control unit for an evaluation of the trigger condition and an emission of a notification of fulfillment of the condition to the management unit.

2. The configuration method according to claim 1, further comprising the following step of:
defining a customized configuration of an alert related to a device or a device group, by the second user having a user profile of a second type.

3. The configuration method according to claim 1, further comprising the following step of:
providing the first user having the user profile of the first type with a first interface for configuring an Alert and with the corresponding trigger condition.

4. The configuration method according to claim 1, further comprising the following step of:
providing a second user having a profile of a second type with a second interface for selecting installations, devices/parameters or state variables.

5. A method for supervising a home automation installation being located on a single building and comprising at least one home automation device and at least a central control unit to which the at least one home automation device is related, the method being executed by a management unit connected to the home automation installation and comprising the following steps of:
receiving a notification message of fulfilling a condition from the central control unit, the notification message of fulfilling the condition coming from the central control unit, the notification message of fulfilling the condition corresponding to a fulfillment of a trigger condition relating to at least one state variable of the at least one home automation device, the trigger condition having been configured by a first user having a profile of a first type;
determining at least one second user of a second type to be notified depending on a correspondence between the at least one home automation device and said the at least one second user, wherein said first user and said second user are different from each other;
emitting at least one alert notification message to the at least one second user.

6. The supervision method according to claim 5, comprising the following step of:
checking the existence of a configuration specific to the at least one second user concerning a desire to receive an alert notification in order to determine whether an alert notification is sent or not.

7. The supervision method according to claim 6, comprising the following step of:
sending a message to the central control unit in order to trigger the execution of an action, in particular an action on the at least one home automation device.

8. The supervision method according to claim 7, comprising the following step of:
storing values of the at least one state variable.

9. The supervision method according to claim 6, comprising the following step of:
storing values of the at least one state variable.

10. The supervision method according to claim 5, comprising the following step of:
sending a message to the central control unit in order to trigger the execution of an action, in particular an action on the at least one home automation device.

11. The supervision method according to claim 10, comprising the following step of:
storing values of the at least one state variable.

12. The supervision method according to claim 5, comprising the following step of:
storing values of the at least one state variable.

* * * * *